United States Patent
Salter

(10) Patent No.: US 9,622,457 B1
(45) Date of Patent: Apr. 18, 2017

(54) PET GROOMING SYSTEM

(71) Applicant: Esin Salter, Sunnyvale, CA (US)

(72) Inventor: Esin Salter, Sunnyvale, CA (US)

( * ) Notice: Subject to any disclaimer, the term of this patent is extended or adjusted under 35 U.S.C. 154(b) by 72 days.

(21) Appl. No.: 14/098,675

(22) Filed: Dec. 6, 2013

Related U.S. Application Data

(63) Continuation-in-part of application No. 13/225,529, filed on Sep. 5, 2011, now abandoned.

(51) Int. Cl.
*A01K 13/00* (2006.01)
*A46B 5/04* (2006.01)

(52) U.S. Cl.
CPC .............. *A01K 13/002* (2013.01); *A46B 5/04* (2013.01); *A46B 2200/1093* (2013.01)

(58) Field of Classification Search
CPC .... A01K 13/00; A01K 13/001; A01K 13/002; A46B 5/02; A46B 5/0095; A46B 5/021; A46B 5/04; A46B 13/005; A46B 15/0055; A46B 9/06; A46B 9/00; A46B 9/02; A46B 2200/1093; B26B 21/16
USPC ........ 119/611, 612, 625, 633, 644, 630–632; 15/160, 207.2, 227
See application file for complete search history.

(56) References Cited

U.S. PATENT DOCUMENTS

| | | | | |
|---|---|---|---|---|
| 5,009,195 A | * | 4/1991 | Damm | A01K 13/002 119/633 |
| 5,682,837 A | * | 11/1997 | Courtney | A46B 5/04 119/625 |
| 6,367,422 B1 | * | 4/2002 | Wilhelmi | A01K 13/002 119/625 |
| 9,004,009 B2 | * | 4/2015 | Kissel, Jr. | A01K 13/002 119/609 |
| 2003/0049407 A1 | * | 3/2003 | Kacher | A47L 13/16 428/100 |
| 2007/0125310 A1 | * | 6/2007 | Oberstadt | A01K 13/001 119/601 |
| 2007/0226874 A1 | * | 10/2007 | Cain | A41D 19/0024 2/159 |
| 2007/0277288 A1 | * | 12/2007 | Sing | A46B 5/04 2/159 |

* cited by examiner

*Primary Examiner* — Joshua Huson
*Assistant Examiner* — George Andonyan

(57) ABSTRACT

A glove has a separate finger section, a separate palm section, and a separate thumb section. The glove has a plurality of separate substrate sheets. Each substrate sheet has top and bottom surfaces. The separate finger section and the separate thumb section and the separate palm section adhesively receive and support at least one substrate sheet. A plurality of sticks are attached to each substrate sheet. A plurality of hooks are attached to each substrate sheet. The sticks are arched and the hooks are in an inverted J-shaped configuration.

2 Claims, 4 Drawing Sheets

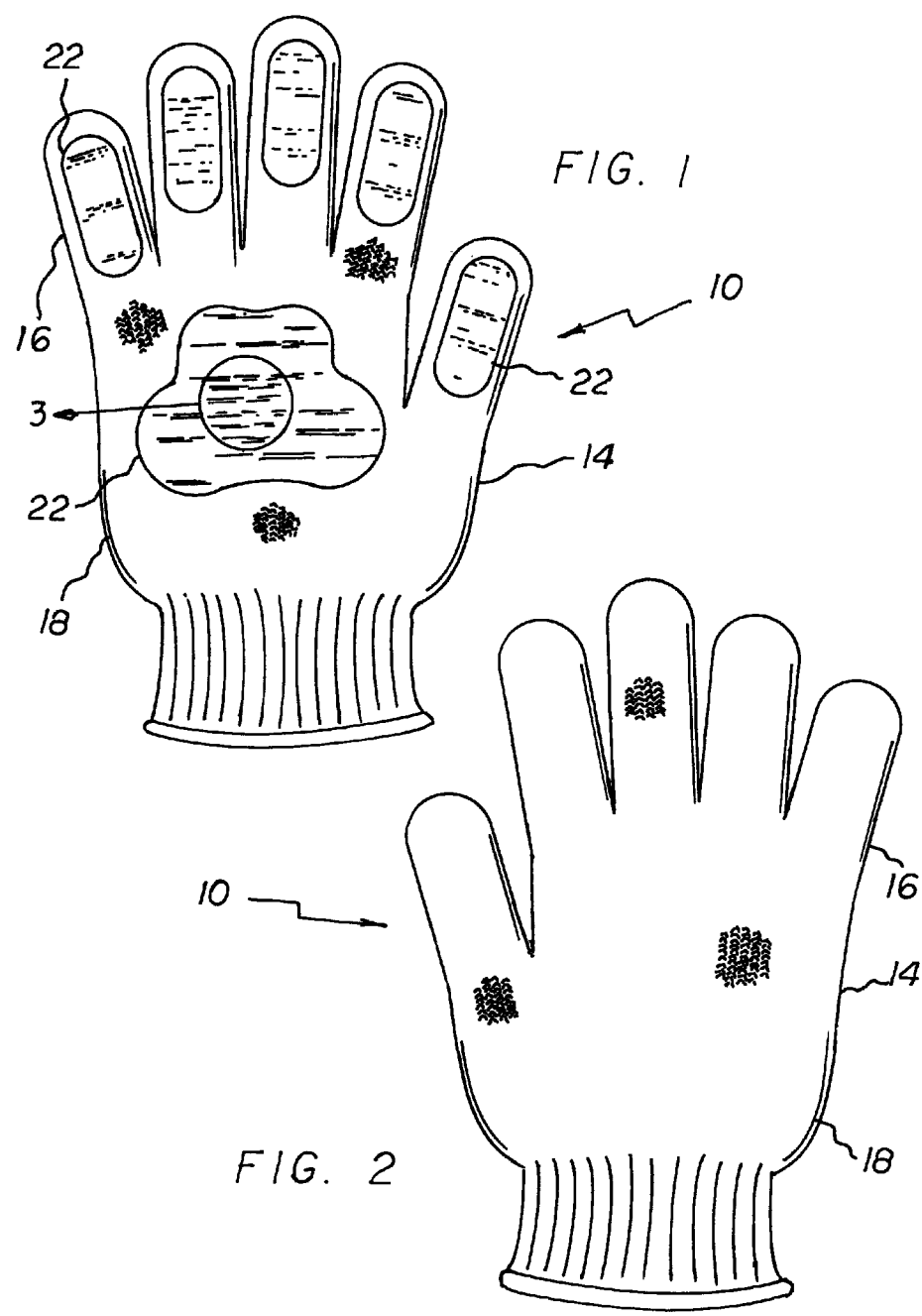

FIG. 3
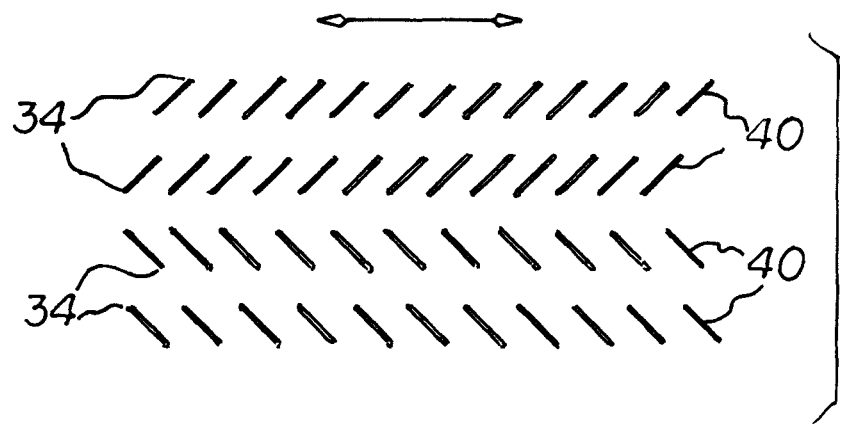
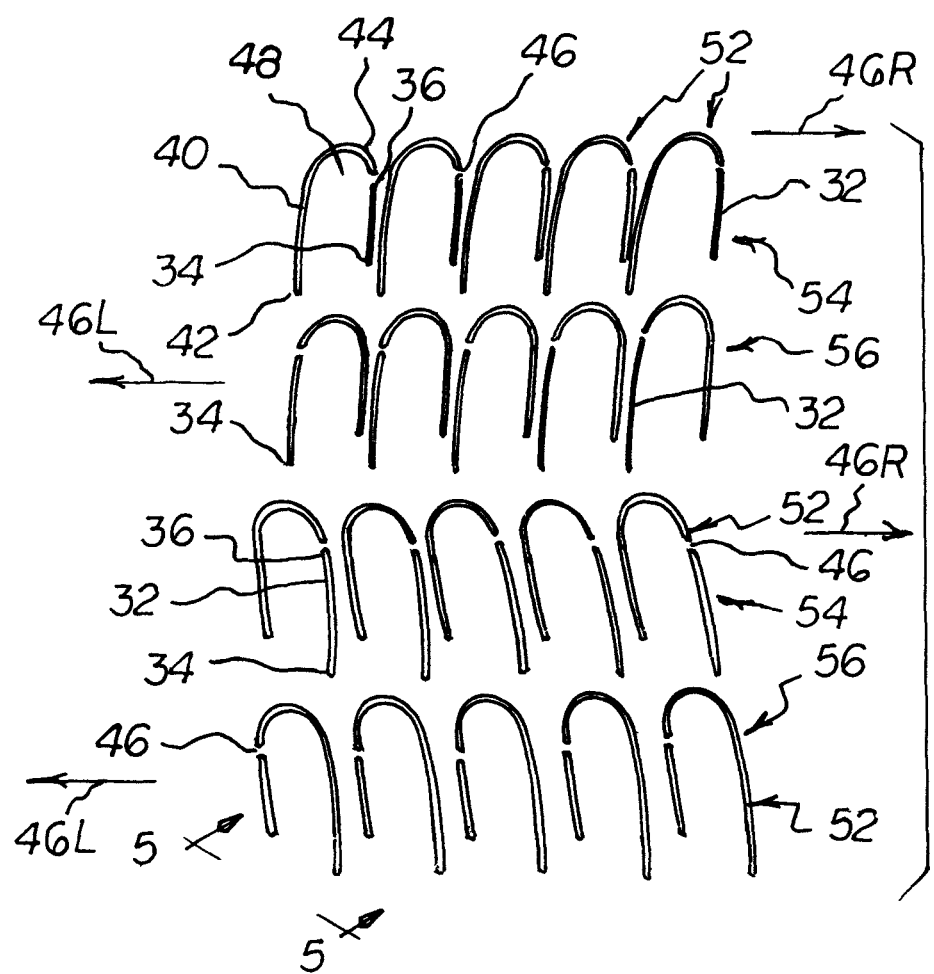
FIG. 4

PET GROOMING SYSTEM

RELATED APPLICATION

The present application is a continuation-in-part of U.S. patent application Ser. No. 13/225,529 filed Sep. 5, 2011, the subject matter of which is incorporated herein by reference.

BACKGROUND OF THE INVENTION

Field of the Invention

The present invention relates to a pet grooming system and more particularly pertains to contacting a pet with hair, causing movement between the pet and the system and for removing of contacted hair from the pet, the contacting and movement and the removing being done in a safe, convenient and economical manner.

SUMMARY OF THE INVENTION

In view of the foregoing disadvantages inherent in the known types of pet grooming systems now present in the prior art, the present invention provides an improved pet grooming system. As such, the general purpose of the present invention, which will be described subsequently in greater detail, is to provide a new and improved pet grooming system and method which has all the advantages of the prior art and none of the disadvantages.

To attain this, the present invention essentially comprises a substrate sheet with top and bottom surfaces. A plurality of sticks each have a lower end attached to the substrate sheet. Each of the sticks also has an upper end spaced above the top surface by a first distance. A plurality of hooks each have a lower end attached to the substrate sheet. The hook also has an upper end spaced above the top surface in operative proximity to the upper end of an associated stick to form an opening. Each hook has an intermediate extent spaced from the top surface by a second distance. The second distance is greater than the first distance. Lastly, a plurality of sets is provided. Each set is formed of a stick and an associated hook. The sets are positioned in rows and columns with the openings of one row facing in a first direction and the openings of an adjacent row facing in a second direction, opposite from the first direction.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet grooming system which has all of the advantages of the prior art grooming systems of known designs and configurations and none of the disadvantages.

It is another object of the present invention to provide a new and improved pet grooming system which may be easily and efficiently manufactured and marketed.

It is a further object of the present invention to provide a new and improved pet grooming system which is of durable and reliable constructions.

An even further object of the present invention is to provide a new and improved pet grooming system which is susceptible of a low cost of manufacture with regard to both materials and labor, and which accordingly is then susceptible of low prices of sale to the consuming public, thereby making such pet grooming system economically available to the buying public.

Lastly, another object of the present invention is to provide a pet grooming system for contacting a pet with hair, causing movement between the pet and the system and for removing of contacted hair from the pet, the contacting and movement and the removing being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a pet grooming system constructed in accordance with the principles of the present invention.

FIG. 2 is a rear elevational view of the system shown in FIG. 1.

FIG. 3 is an enlarged illustration of stick/hook sets taken at circle 3 of FIG. 1.

FIG. 4 is a perspective illustration of several stick/hook sets shown in FIG. 3.

The same reference numerals refer to the same parts throughout the various Figures.

DESCRIPTION OF THE PREFERRED EMBODIMENT

Figures 5, 6, 7, 8:
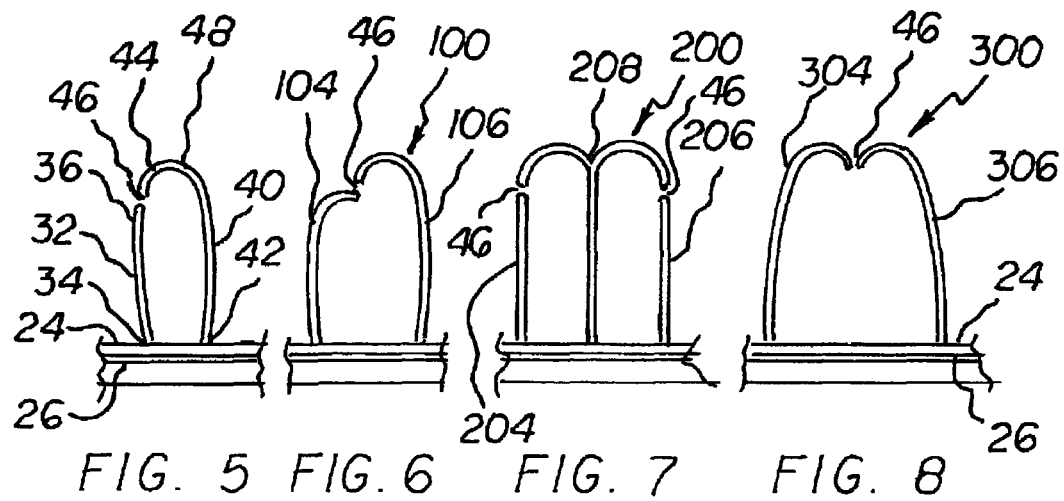
FIGS. 5 through 8 illustrate various embodiments of the stick/hook sets shown the prior Figures.

With reference now to the drawings, and in particular to FIG. 1 thereof, the preferred embodiment of the new and improved pet grooming system embodying the principles and concepts of the present invention and generally designated by the reference numeral 10 will be described.

The present invention, the pet grooming system 10 is comprised of a plurality of components. Such components in their broadest context include a substrate sheet, a plurality of sticks, a plurality of hooks, and a plurality of sets. Such components are individually configured and correlated with respect to each other so as to attain the desired objective.

First provided is a glove 14. The glove has an upper section 16, 406 for fingers of a wearer. The glove has a lower section 18, 404 for the palm of the wearer.

Substrate sheets 22 are provided. The substrate sheets are fabricated of a flexible material. The substrate sheets have a top surface 24 and a bottom surface 26. The substrate sheets are adhesively secured to the upper and lower sections of the glove.

Provided next is a plurality of sticks 32. Each stick has a lower end 34. The lower end is attached to the top surface of the substrate sheet. Each stick has an upper end 36. The upper end is spaced above the top surface by a first distance. The sticks are positioned in rows and columns. Note FIG. 3.

Further provided is a plurality of hooks 40. Each hook has a lower end 42. The lower end is attached to the top surface of the substrate sheet. Each hook has an upper end 44. The upper end is spaced above the top surface. The upper end of each hook is in close operative proximity to the upper end of an associated stick. In this manner an opening 46 is formed. Each hook has an intermediate extent 48. The intermediate extent is spaced from the top surface by a second distance. The second distance is greater than the first distance. Each hook has an associated stick to form sets.

Provided last is a plurality of sets 52. The sets are positioned in horizontal first and second rows and vertical columns. The first rows 54 have openings which face in a first direction 46R. The second rows 56 have openings which face in a second direction 46L opposite from the first direction. The rows alternate between first rows and second rows.

Two contiguous rows of sets are positioned in first operational planes at an angle of 45 degrees, plus or minus 10 percent, in a first direction above horizontal. Two contiguous rows of sets are positioned in second operational planes at an angle of 45 degrees, plus or minus 10 percent, in a second direction below horizontal.

In an alternate embodiment, two contiguous rows of sets are positioned in first operational planes at an angle of less than 45 degrees in a first direction above horizontal. Two contiguous rows of sets are positioned in second operational planes at an angle of less than 45 degrees in a second direction below horizontal. Note FIGS. 3 and 4.

In the first alternate embodiment of the present invention, the system 100 includes sticks 104. The sticks are provided in a short J-shaped configuration. Hooks 106 are provided. The hooks are in a long inverted J-shaped configuration. Note FIG. 6.

In the second alternate embodiment of the present invention, the system 200 includes sticks. The sticks are adjacent parallel sticks 204, 206. The hooks are double inverted J-shaped hooks 208 positioned between the parallel sticks. Note FIG. 7.

In the third alternate embodiment of the present invention, the system 300 includes sticks 304. The sticks are provided in a long J-shaped configuration. The hooks 306 are in a long inverted J-shaped configuration. Note FIG. 8.

The invention includes sticks which are arched and the hooks are in an inverted J-shaped configuration.

Figure 9:
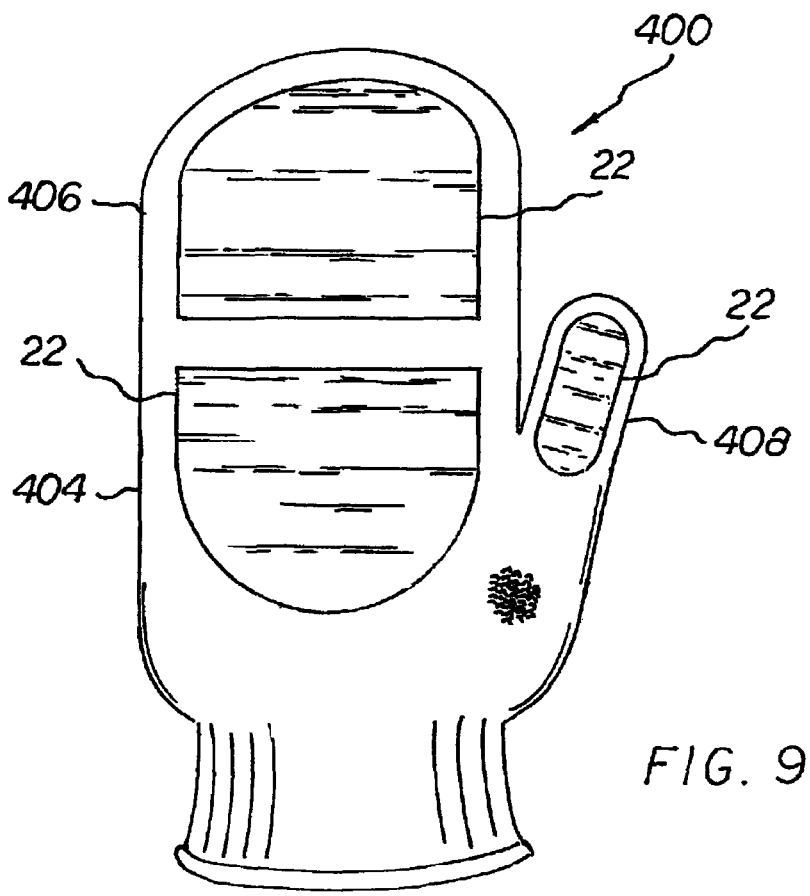
FIG. 9 is a front view of a mitten embodiment of the invention.

In the fourth alternate embodiment of the present invention, glove of the system 400 is in mitten form. The glove has a lower section 404 for a palm, an enlarged section 406 for fingers, and a thumb section 408. The lower, enlarged, and thumb sections adhesively receive at least one substrate sheet. Note FIG. 9.

Figure 10:
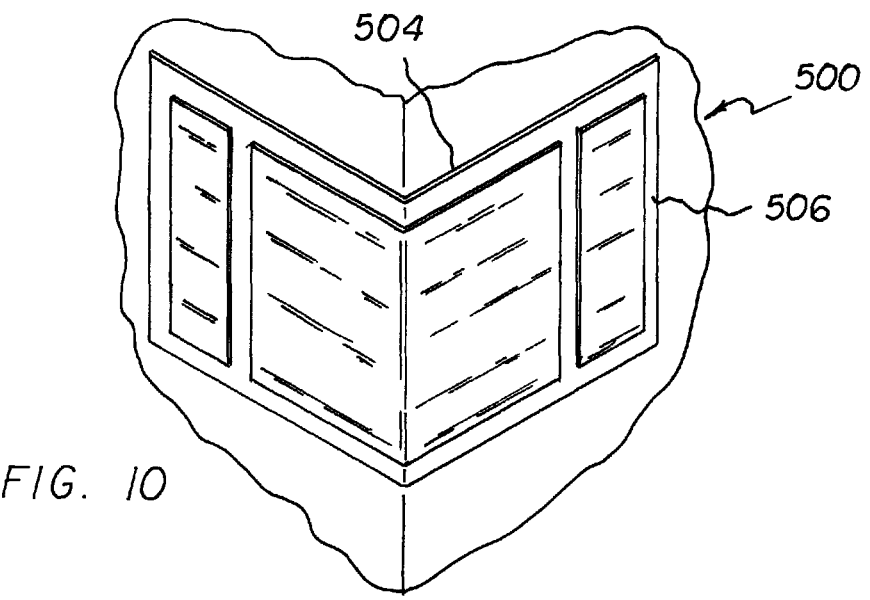
FIGS. 10 and 11 are additional alternate embodiments of the invention.

In the next alternate embodiment of the present invention, the system 500 further includes an L-shaped support 504 positionable at a corner of a room. The support has an exterior surface for adhesively receiving the substrate sheet 506. FIG. 10.

Figure 11:
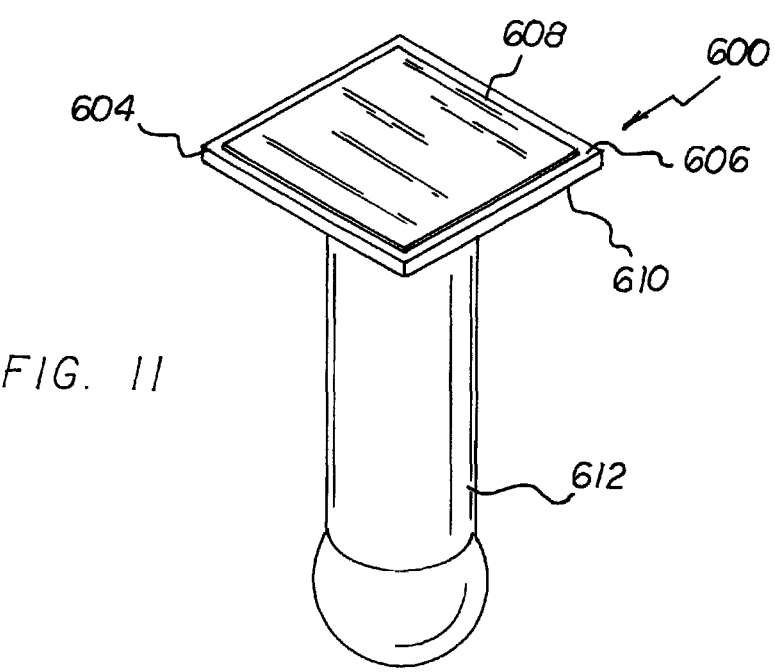

In the final alternate embodiment of the present invention, the system 600 further includes a planar support 604. The planar support has an exterior surface 606. A substrate sheet 608 is provided. The exterior surface adhesively receives the substrate sheet. The planar support has an interior surface 610 with a handle 612. Note FIG. 11.

The multi-directional openings in combination with the alternating angles will function together to maximize the removal and retention of pet hair during use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet grooming system comprising:
   a glove with a finger section, a palm section, and a thumb section;
   a plurality of separate substrate sheets, each substrate sheet having top and bottom surfaces, the finger section and the palm section and the thumb section each adhesively receiving at least one substrate sheet;
   a plurality of sticks where each stick has a lower end attached to the substrate sheet and each stick has an upper end spaced above the top surface of each substrate sheet by a first distance and each stick having a free upper end facing upwardly;
   a plurality of hooks having a lower end attached to an associated substrate sheet and having a free upper end facing downwardly and spaced above the top surface of each substrate sheet in operative proximity to the free upper end of an associated stick to form an opening,
   each hook having an intermediate extent spaced from the top surface by a second distance greater than the first distance, each stick and each hook having the same cross sectional configuration along their entire lengths, the sticks being arced and the hooks being in an inverted J-shaped configuration, a plurality of sets, wherein each set is formed of said stick and an associated hook having an inverted U-shaped configuration when in a rest position with the free upper end of each hook in alignment with each free upper end of an associated stick; and wherein said plurality of sets, being positioned in rows and columns, the openings of one row facing in a first direction, the openings of an adjacent row facing in a second direction, opposite from the first direction, said sticks and said associated hooks being positioned in horizontal first and second rows and vertical columns, the first rows having openings facing in said first direction, the second rows (56) having openings facing in said second direction, opposite from the first direction, the rows alternating between first rows and second rows, wherein two contiguous rows of sets being positioned in first operational planes at an angle of less than 45 degrees in a first direction above horizontal and wherein two contiguous rows of sets are positioned in second operational planes at an angle of less than 45 degrees in a second direction below horizontal.

2. A pet grooming system (10) comprising, in combination:

a glove (14) having an upper section (16)(406) for fingers of a wearer, the glove having a lower section (18)(408) for the palm of the wearer;

substrate sheets (22), the substrate sheets being fabricated of a flexible material, each substrate sheet having a top surface (24) and a bottom surface (26), the substrate sheets adhesively secured to the upper and lower sections of the glove;

a plurality of sticks (32), each stick having a lower end (34) attached to the top surface of the substrate sheet, each stick having an upper end (36) spaced above the top surface by a first distance, the sticks being positioned in rows and columns and each stick having a free upper end facing upwardly;

a plurality of hooks (40), each hook having a lower end (42) attached to the top surface of the substrate sheet, each hook having an upper end (44) spaced above the top surface, the upper end of each hook being in dose operative proximity to the upper end of an associated stick to form an opening (46), each hook having an intermediate extent (48) spaced from the top surface by a second distance greater than the first distance, each stick and each hook having the same cross-sectional configuration along their entire lengths, each hook having said associated stick to form a plurality of sets, wherein each set is formed of said stick and an associated hook having an inverted U-shaped configuration when in a rest position with the free upper end of each hook in vertical alignment with each free upper end of said associated stick; and wherein said plurality sets (52), being positioned in horizontal first and second rows and vertical columns, the first rows (54) having openings facing in a first direction (46R), the second rows (56) having openings facing in a second direction (46L), opposite from the first direction, the rows alternating between first rows and second rows, two contiguous rows of sets being positioned in first operational planes at an angle of less than 45 degrees in a first direction above horizontal and two contiguous rows of sets being positioned in second operational planes at an angle of less than 45 degrees in a second direction below horizontal.

* * * * *